(12) United States Patent
Haggar et al.

(10) Patent No.: US 7,729,879 B2
(45) Date of Patent: Jun. 1, 2010

(54) APPARATUS AND METHOD TO INTEGRATE HARDWARE ADAPTER DIAGNOSTICS WITH A HOST OS DIAGNOSTICS THROUGH SIGNALING

(75) Inventors: Jeffrey D. Haggar, Holly Springs, NC (US); Hugh E. Hockett, Raleigh, NC (US); Maurice Isrel, Raleigh, NC (US); Bruce H. Ratcliff, Red Hook, NY (US); Jerry W. Stevens, Raleigh, NC (US); Stephen R. Valley, Valatie, NY (US); Edward Zebrowski, Jr., Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 62 days.

(21) Appl. No.: 11/736,432

(22) Filed: Apr. 17, 2007

(65) Prior Publication Data

US 2008/0262638 A1  Oct. 23, 2008

(51) Int. Cl.
*G01M 19/00* (2006.01)
(52) U.S. Cl. .................................................. 702/122
(58) Field of Classification Search ............... 702/122; 371/22.1; 714/45
See application file for complete search history.

(56) References Cited

U.S. PATENT DOCUMENTS

| | | | |
|---|---|---|---|
| 6,084,859 A | 7/2000 | Ratcliff et al. | |
| 6,145,123 A | 11/2000 | Torrey et al. | |
| 6,161,201 A * | 12/2000 | Payne et al. | 714/43 |
| 6,185,218 B1 | 2/2001 | Ratcliff et al. | |
| 6,202,199 B1 | 3/2001 | Wygodny et al. | |
| 6,327,621 B1 | 12/2001 | Lee et al. | |
| 6,389,027 B1 | 5/2002 | Lee et al. | |
| 6,445,682 B1 | 9/2002 | Weitz | |
| 6,490,285 B2 | 12/2002 | Lee et al. | |
| 6,529,427 B1 | 3/2003 | Guo | |
| 6,577,597 B1 | 6/2003 | Natarajan et al. | |
| 6,584,491 B1 | 6/2003 | Niemi et al. | |
| 6,584,502 B1 | 6/2003 | Natarajan et al. | |
| 6,600,743 B1 | 7/2003 | Lee et al. | |
| 6,668,277 B1 | 12/2003 | Gritzo | |
| 6,772,221 B1 | 8/2004 | Ratcliff et al. | |
| 6,836,881 B2 | 12/2004 | Beynon et al. | |
| 6,988,008 B2 * | 1/2006 | Hudson et al. | 700/1 |
| 7,020,598 B1 * | 3/2006 | Jacobson | 703/14 |
| 7,139,681 B2 | 11/2006 | Yoshie et al. | |
| 7,162,533 B2 * | 1/2007 | Klemets | 709/231 |
| 7,308,492 B2 * | 12/2007 | Konopka et al. | 709/221 |

(Continued)

OTHER PUBLICATIONS

International Search Report; International Application No. PCT/EP2008/053802; International Filing Date: Mar. 31, 2008; Date of mailing: Jan. 8, 2008; 12 pages.

*Primary Examiner*—Aditya Bhat
(74) *Attorney, Agent, or Firm*—Cantor Colburn LLP; Steven Chiu

(57) ABSTRACT

The present invention provides a system and method for controlling diagnostic functions on a remote device. The system includes a host, and a network adapter in communication with the host. The system performs a method comprising receiving a diagnostic signal from the host device on the remote device, associating the diagnostic signal with a diagnostic state of the remote device, and performing a diagnostic function indicated by the diagnostic signal.

30 Claims, 3 Drawing Sheets

U.S. PATENT DOCUMENTS

2002/0049801 A1* 4/2002 Beynon et al. ............. 709/102
2002/0198983 A1   12/2002 Ullmann et al.
2003/0061550 A1    3/2003 Ng et al.
2005/0091373 A1    4/2005 Ciapala et al.
2006/0045089 A1    3/2006 Bacher et al.

* cited by examiner

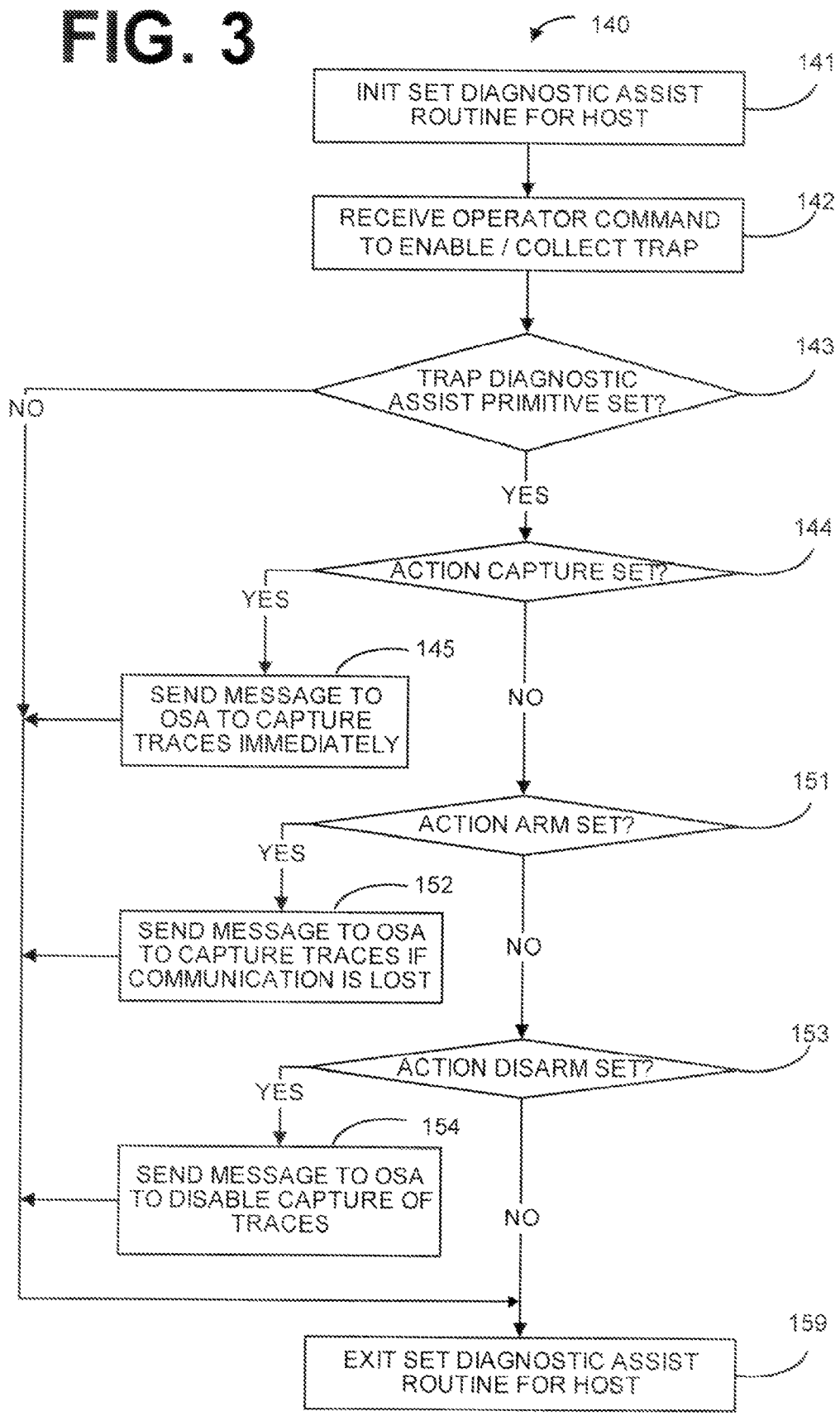

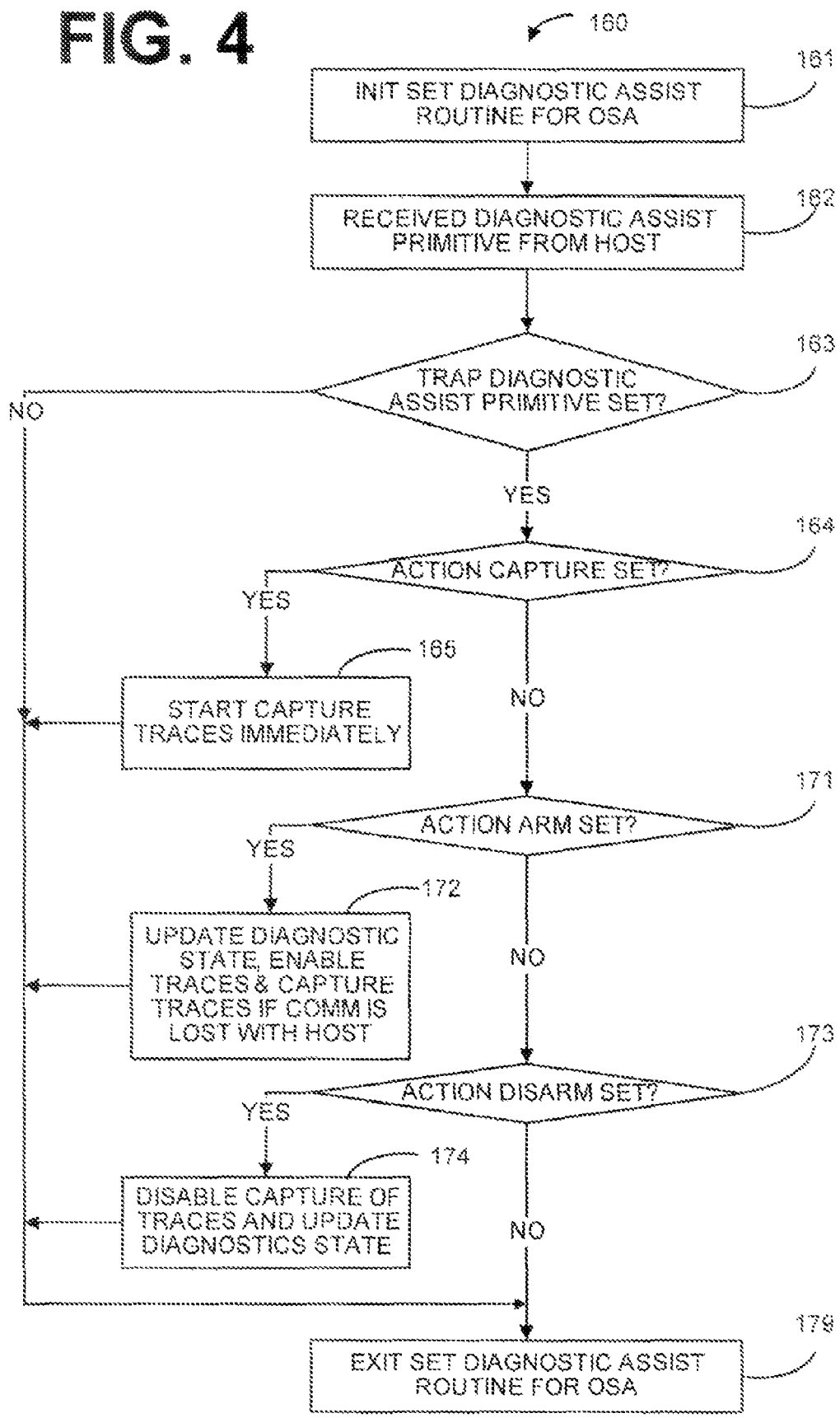

APPARATUS AND METHOD TO INTEGRATE HARDWARE ADAPTER DIAGNOSTICS WITH A HOST OS DIAGNOSTICS THROUGH SIGNALING

CROSS REFERENCE TO RELATED APPLICATIONS

The present application is co-pending with application Ser. No. 11/736,477, filed Apr. 17, 2007, and assigned to the assignee of the present application.

BACKGROUND

The IBM Open Systems Adapter (OSA) is a hardware element that interfaces between an IBM S/390 or zSeries processor and a network, which may be a private network within an enterprise, a public network, or a combination of both. References that describe the Open Systems Adapter include the following patents, patent applications and publications, incorporated herein by reference; U.S. Pat. No. 6,772,221, Ratcliff et al., "Dynamically configuring and monitoring hosts connected in a computing network having a gateway device"; U.S. Pat. No. 6,600,743, Lee et ah, "IP multicast interface"; U.S. Pat. No. 6,490,285, Lee et ah, "IP multicast interface"

U.S. Pat. No. 6,389,027, Lee et al., "IP multicast interface"; U.S. Pat. No. 6,327,621. Lee et al., "Method for shared multicast interface in a multi-partition environment"; U.S. Pat. No. 6,185,218, Ratcliff et al., "Communication method and apparatus for use in a computing network environment having high performance LAN connections"; and U.S. Pat. No. 6,084,859, Ratcliff et al, "Internet Protocol assists using multi-path channel protocol".

In many communications error scenarios associated with server and network communications, it is not always clear if the source of the problem is a software (e.g. Operating Systems) or hardware (e.g. network adapter) error. Often the external symptoms of the problem may not reveal the root source of the problem. When this occurs, both software and hardware documentation (traces and dumps) must be collected. This process is often referred to as "Problem Determination". Problem determination is the process of isolating the source of the problem to a specific product (most often hardware vs. software).

Although each product (software and hardware) has tools that provide data collection, what is missing is the ability to capture both hardware and software traces at the same time for the same instance of an error. This deficiency causes many problems recreating attempts and in some field situations can lead to customer satisfactions issues.

Most Operating Systems have a set of tools that allows a trap to be set to capture software traces and/or dumps based on specific events. For example, in z/OS, this type of tool is the MVS SLIP command, or in CommServer the INOP-DUMP command. Today network adapter (e.g. OSA) traces must be manually controlled (started and stopped) by a systems operator using the HMC.

What is needed is the ability to tie the software and hardware trace collection process together.

SUMMARY

Embodiments of the present invention provide a system and method for diagnostic functions on a remote device. Briefly described, in architecture, one embodiment of the system, among others, can be implemented as follows. The system includes a host, and a network adapter in communication with the host. The system performs a method comprising receiving a diagnostic signal from the host device on the remote device, associating the diagnostic signal with a diagnostic state of the remote device, and performing a diagnostic function indicated by the diagnostic signal.

Embodiment of the present invention can also be viewed as providing methods for controlling diagnostic functions on a remote device. In this regard, one embodiment of such a method, among others, can be broadly summarized by the following steps. The method operates by receiving a diagnostic signal from a host device on the remote device and associating the diagnostic signal with a diagnostic state of the remote device. Then, the method performs a diagnostic function indicated by the diagnostic signal.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIGS. 3 and 4 are flow charts of the process that integrates diagnostics through signaling method of the present invention.

DETAILED DESCRIPTION

The present invention provides the ability to tie the software and hardware trace collection process together. This is accomplished with a host OS signal to network adapter to instruct adapter to also capture traces when a software trap event occurs. This capability will allow the software and hardware traces to be captured, correlated, and coordinated at the same time based on the same error event.

The present invention describes a new function that allows the host OS to control OSA diagnostic functions (trap, trace, dump, etc). A new control signal (assist primitive) will be created to provide this support. The new assist primitive will have the following attributes: (1) the assist function is based on existing QDIO architecture (similar to IP Assist); (2) the function is applicable to both Layer 2 and Layer 3 modes of QDIO (OSN will be deferred); (3) the new primitive is extendable to new trace actions and functions and will support the TRAP function with actions Arm, DisArm, and Capture.

A new control signal is required to provide this support. This signal will allow the host operating system operator to control various OSA diagnostic functions (initially trap). The new primitive will be applicable to all supported QDIO modes (layer 2, layer 3, and OSN). Therefore, a new QDIO assist primitive is created for this design. The new primitive will be here after referred to as "Set Diagnostic Assist" (Set-DiagAsst).

Figure 1:
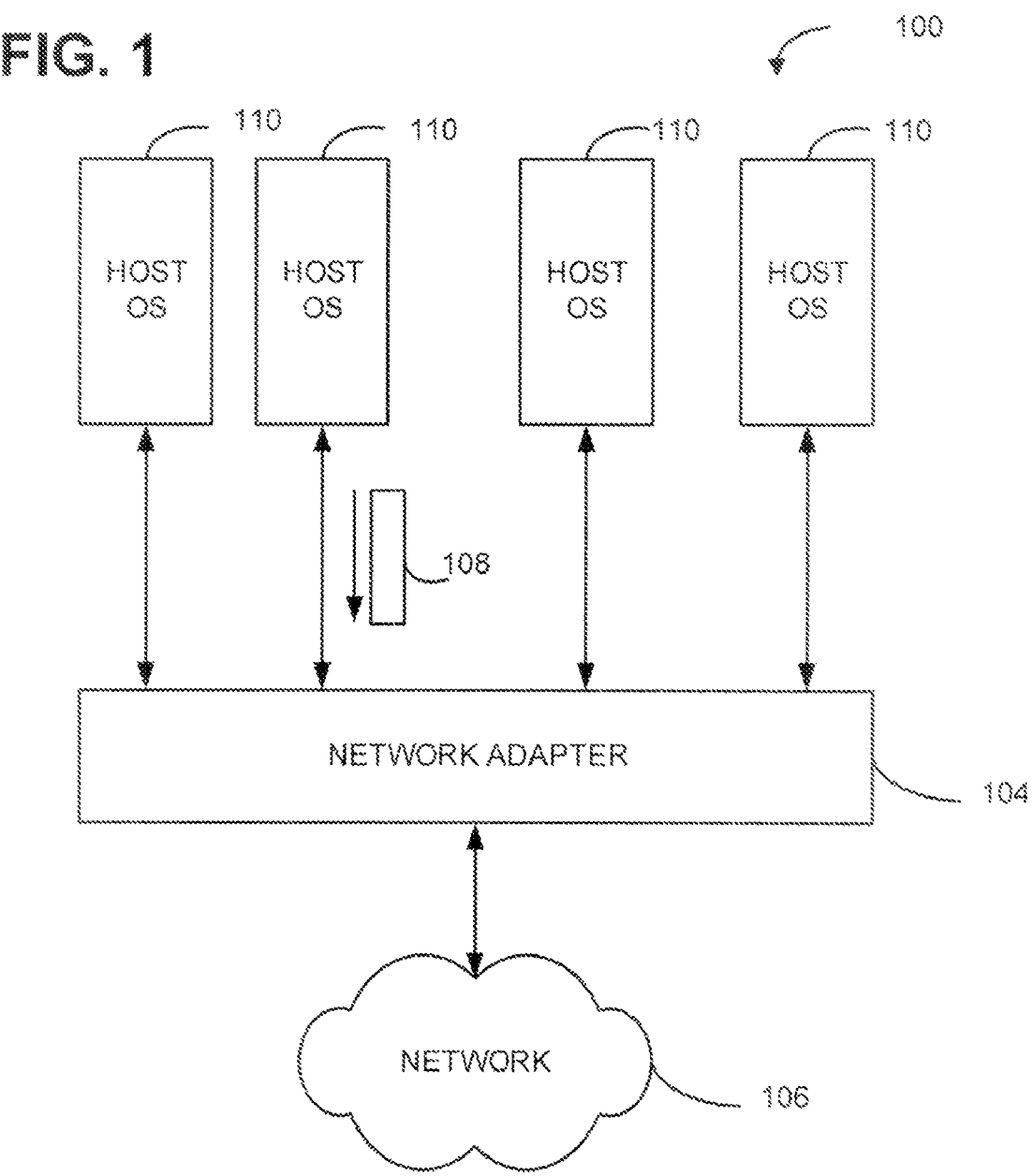
FIG. 1 is a block diagram of a virtual network configuration utilizing integrated diagnostics through signaling methods of the present invention.

FIG. 1 is a block diagram of a virtual network configuration utilizing integrated diagnostics through signaling methods of the present invention, FIG. 1 shows a configuration 100 incorporating the present invention. Configuration contains a physical machine 100 coupled via a network adapter 104 to a network 106. A physical machine 100 is a data processing system suitable for storing, and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution, input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

While the present invention is not limited to any particular hardware or software platform, in a exemplary embodiment the physical machine 100 may constitute an IBM™ eSeries™ zSeries™ server (IBM, eServer and zSeries are trademarks of IBM Corporation). Network adapter 104 (also referred to herein as an OSA) forwards data packets 108 between the network 106 and physical machine 100 and may comprise an IBM Open Systems Adapter (OSA), described in the patents and publications referenced above. Network 106 may be an internal network such as a local area network (LAN) within an organization, an external network, or a combination of both and may have other physical machines or devices (not shown) coupled to it. In a conventional manner, physical machine 100 is partitioned into a plurality of logical machines, each of which has its own host operating system (OS) 110 (also referred to herein as a "server" or simply a "host"), for example, an instance of the IBM z/OS™ or z/VM™ operating system or a UNIX™ based operating system such as the Linux™ operating system (z/OS and z/VM are trademarks of IBM: Corporation; UNIX is a registered trademark of The Open Group in the United States and other countries; Linux is a trademark of Linus Torvalds in the United States, other countries, or both).

Figure 2:
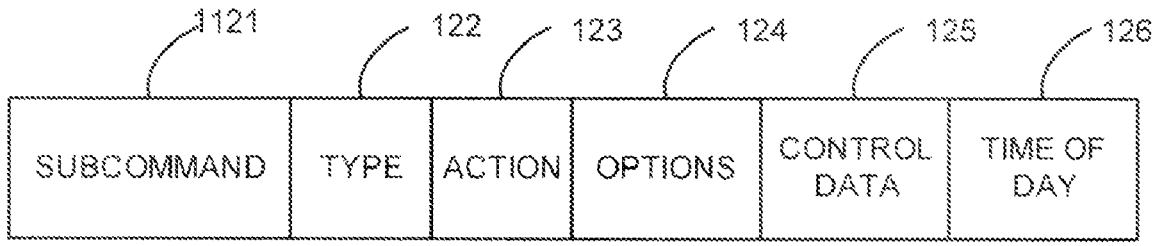
FIG. 2 is a block diagram of a signaling data packet utilized by the virtual network configuration as shown in FIG. 1.

FIG. 2 is a block diagram of a signaling control signal data packet utilized by the virtual network configuration as shown in FIG. 1. Each control signal data packet 108 traveling between network adapter 104 and either machine 102 or network 106 contains a number of fields of interest to the present invention, may include, but are not limited to Subcommand 121 (trace, trap or dump). Type 122 (the type of Trace, Trap, or Dump that will be affected). Action 123 (the action that is to be taken (e.g. for Trap=Arm, DisArm, Capture); Options 124 (specific options applicable to the specific subcommand and action): Control Data 125 (optional control "data" or information based on type of subcommand and action); and TOD 126 (a double word host generated data representing the time of day that the host sent the command to OSA). The TOD 126 provides the ability to synchronize the host 110 and remote device Time of Day clocks (occurs during setdiagsst enable trap)

An example for Subcommand=Trap and Action=Arm, a Trap Identifier (Trap ID) is passed to the adapter to associated the adapter trap with a specific host trap. Control data is optional with a supported length range of 0-256 bytes.

In the illustrated example, the present invention utilizes a Trap subcommand that has the following three functions (actions) with each action having the following rules.

Action=Capture indicates OSA should stop and "capture" traces immediately. Action=Arm indicates OSA should update the "Diagnostic Assist State" to "Arm". This means that the OSA 104 will maintain a new state called the "Diagnostic Assist State" which reflects the status of the last SetDiagAsst primitive. The Arm action solves the scenario in which the host OS 110 can no longer communicate with the OSA 104 to signal the OSA 104 to capture traces (i.e. the "error" itself resulted in a loss of communications).

Action=DisArm indicates OSA should update the Diagnostic Assist State to "DisArm" The host will disarm the trap when either; the trap has been disabled or the device was stopped or shutdown (i.e. the trap (error) never occurred).

FIGS. 3 and 4 are flow charts of the processes that integrate diagnostics through signaling method of the present invention. As shown in FIG. 3 is the set diagnostic assist routine 140 for the host 110 and in FIG. 4 is the set diagnostic assist routine 160 for the OSA 104.

Referring to FIG. 3, the set diagnostic assist routine 140 is initialized at step 141, The initialization includes the establishment of data values for particular data structures utilized in the set diagnostic assist routine 140. At step 142, the host 110 receives an operator command to enable or collect a trap. Thus, either the operator command triggers the enable or disable of the capture or the host 110 recognized error event, which triggers the capture. A trap can be enabled when a software error condition occurs and is recognized by the host as virtually any type of error condition (host message, ABEND, storage error, missing packet, etc.) at any point in time (seconds, hours, days, etc). When this error event occurs is what triggers and drives the capture primitive.

At step 143, the host 110 determines if the trap diagnostic assist primitive is set. If it is determined at step 143 the trap diagnostic assist primitive is not set, then the set diagnostic assist routine 140 exits at step 159. However, if it is determined at step 143 the diagnostic assist primitive is set, then it is determined if the action to be taken it is a capture function. If it is determined to step 144 that the action to be taken is a capture, then the host 110 sends a message to the OSA 104 instructing the OSA 104 to capture traces immediately, at step 145. The OSA 104 will update the note the trap ID and TOD for this command. The host 110 trace post processing will be used to equate the OSA TOD to an equivalent host 110 TOD.

However, if it is determined at step 144 that the action to be taken is not a capture function, then it is determined at step 151 if the action to be taken is a set arm function. If it is determined at step 151 that the action is a set arm function than the host 110 sends a message to the OSA 104 to capture traces if communication is lost at step 152. When OSA 104 receives a SetDiagAsst with Action=Arm, it will update the Diagnostic Assist State and note the trap ID and TOD for this command. This signal indicates a host software trap has been set, and that OSA 104 traces are also requested (if or when the failure occurs). If communications is lost with the host 110 (for any reason) and the Diagnostic Assist State is Armed, then OSA must stop and "capture" the OSA traces. Here "capture" has the same meaning to OSA 104 (freeze and preserve the trace table and log). The host 110 trace post processing will be used to equate the OSA TOD to an equivalent host 110 TOD. When the connection is reestablished OSA 104 will always initialize the Diagnostic Assist State to DisArm (no trap is active).

However, if it is determined at step 151 that the action to be taken is not a set arm, then it is determined at step 153 if the action to be taken is a set disarm. If it is determined at step 153 that the action to be taken is a set this arm function, then the host 110 sends a message to the OSA 104 to disable capture of traces at step 154.

The host 110 then exits the set diagnostic assist routine 140 at step 159.

Referring to FIG. 4, the set diagnostic assist routine 160 for the OSA 104 is initialized at step 161. The initialization includes the establishment of data values for particular data structures utilized in the set diagnostic assist routine 160 for OSA 104. At step 162, the OSA 104 receives a set diagnostic assist primitive from a host 110.

At step 163, the OSA 104 determines if the trap diagnostic assist primitive is set. If it is determined at step 163 the trap diagnostic assist primitive is not set, then the set diagnostic assist routine 160 exits at step 159. However, if it is determined at step 163 the diagnostic assist primitive is set, then it is determined if the action to be taken it is a capture function, if it is determined to step 164 that the action to be taken is a capture, then the OSA 104 starts capturing traces immediately, at step 165.

In the illustrated example, host 110 software has detected an error (a trap was triggered) and communications to OSA 104 is still possible (interface is still active and useable; therefore the SetDiagAsst primitive can be sent by the host 110 and processed by OSA 104), Capture means that the trace table (memory) should be saved (along, with other applicable areas such as the log, time of day clock, trap ID, and the like). A capture request does not "DisArm" the trap (does not alter the OSA DiagAsst HostTrap State).

However, if it is determined at step 164 that the action to be taken is not a capture function, then it is determined at step 171 if the action to be taken is a set arm function. If it is determined at step 171 that the action is a set arm function, then the OSA 104 to capture traces if communication is lost at step 152. When OSA 104 receives a SetDiagAsst with Action-Arm, it will update the Diagnostic Assist State. This signal indicates a host software trap has been set, and that OSA traces are also requested if or when the failure occurs, if communications is lost with the host 110 for any reason and the Diagnostic Assist State is Armed, then OSA 104 must stop and "capture" the OSA traces. Capture means that the trace table (memory) should be saved (along with other applicable areas such as the log, time of day clock, trap ID, and the like). When the connection is reestablished OSA 104 will always initialize the Diagnostic Assist State to DisArm (i.e. no trap is active).

However, if it is determined at step 151 that the action to be taken is not a set arm, then it is determined at step 153 if the action to be taken is a set disarm. If it is determined at step 153 that the action to be taken is a set this arm function, then the host 110 sends a message to the OSA 104 to disable capture of traces at step 154. The host 110 will disarm the trap when either: the trap has been disabled or the host 110 was stopped or shutdown (i.e. the trap (error) never occurred). For example, when a trap is active (i.e. an Arm request previously sent), and the operator "disables" the software trap, the host 110 will send a DisArm request to OSA 104. A DisArm is also sent for an active trap when the host 110 is stopped or deactivating. The OS at 104 then exits the set diagnostic assist routine 100 at step 179.

The present invention can take the form of an entirely hardware embodiment, an entirely software embodiment or an embodiment containing both hardware and software elements. In the exemplary embodiment, the invention is Implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium, include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiments) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A method for implementing integrated diagnostic functions on a virtual network configuration, the method comprising:

receiving, at a remote network adapter, a diagnostic signal data packet from a host operating system of a computing device included in the virtual network configuration, the diagnostic signal data packet being triggered by a software trap event occurring within the host operating system, wherein the software trap event comprises a software error condition detected by the host operating system;

associating the diagnostic signal data packet with a diagnostic state of the remote network adapter; and performing, by the remote network adapter, a hardware diagnostic function indicated by the diagnostic signal data packet, the hardware diagnostic function comprising one or more of a trap, a trace, and a dump, thereby facilitating the coordination of hardware and software diagnostics and the same time.

2. The method of claim 1, further comprising capturing a diagnostic trace of the remote network adapter in the event the diagnostic signal data packet received includes a capture signal.

3. The method of claim 2, further comprising setting the diagnostic state of the remote network adapter to be ready to capture a diagnostic trace of the remote network adapter in the event the diagnostic signal data packet received includes an arm signal.

4. The method of claim 3, further comprising capturing the diagnostic trace of the remote network adapter in the event communication with the host operating system is lost while the diagnostic state is armed.

5. The method of claim 4, further comprising setting the diagnostic state of the remote network adapter to a not armed state in the event the diagnostic signal data packet received is a disarm signal, wherein the not armed state disables capturing of the diagnostic trace of the remote network adapter.

6. The method of claim 1, further comprising correlating a captured state of the remote network adapter with the host operating system.

7. A computer readable storage medium having computer readable instructions stored thereon that, when executed by a computer, implement a method of integrating diagnostic functions on a virtual network configuration, wherein the method comprises:
receiving, at a remote network adapter, a diagnostic signal data packet from a host operating system of a computing device included in the virtual network configuration, the diagnostic signal data packet being triggered by a software trap event occurring within the host operating system, wherein the software trap event comprises a software error condition detected by the host operating system;
associating the diagnostic signal data packet with a diagnostic state of the remote network adapter; and
performing, by the remote network adapter, a hardware diagnostic function indicated by the diagnostic signal data packet, the hardware diagnostic function comprising one or more of a trap, a trace, and a dump, thereby facilitating the coordination of hardware and software diagnostics at the same time.

8. The computer readable storage medium of claim 7, wherein the method further comprises capturing a diagnostic trace of the remote network adapter in the event the diagnostic signal data packet received includes a capture signal.

9. The computer readable storage medium of claim 8, wherein the method further comprises setting the diagnostic state of the remote network adapter to be ready to capture a diagnostic trace of the remote network adapter in the event the diagnostic signal data packet received includes an arm signal.

10. The computer readable storage medium of claim 9, wherein the method further comprises capturing the diagnostic trace of the remote network adapter in the event communication with the host operating system is lost while the diagnostic state is armed.

11. The computer readable storage medium of claim 10, wherein the method further comprises setting the diagnostic state of the remote network adapter to a not armed state in the event the diagnostic signal data packet received is a disarm signal, wherein the not armed state disables capturing of the diagnostic trace of the remote network adapter.

12. The computer readable storage medium of claim 9, wherein the method further comprises correlating a captured state of the remote network adapter with the host operating system.

13. A virtual network system with integrated diagnostic function capability, the system comprising:
a host operating system associated with a computing device; and
a remote network adapter in communication with the host operating system, wherein the remote network adapter is configured to:
receive a diagnostic signal data packet from the host operating system, the diagnostic signal data packet being triggered by a software trap event occurring within the host operating system, wherein the software trap event comprises a software error condition detected by the host operating system;
associate the diagnostic signal data packet with a diagnostic state of the remote network adapter; and
perform, by the remote network adapter, a hardware diagnostic function indicated by the diagnostic signal data packet, the hardware diagnostic function comprising one or more of a trap, a trace, and a dump, thereby facilitating the coordination of hardware and software diagnostics at the same time.

14. The system of claim 13, wherein the remote network adapter is configured to capture a state thereof if the diagnostic signal data packet received is a capture signal.

15. The system of claim 14, wherein the diagnostic state of the remote network adapter is configured to be ready to capture a diagnostic trace thereof in the event the diagnostic signal data packet received includes an arm signal.

16. The system of claim 15, wherein the diagnostic trace of the remote network adapter is captured in the event communication with the host operating system is lost while the diagnostic state is armed.

17. The system of claim 16, wherein the diagnostic state of the remote network adapter is set to a not armed state in the event the diagnostic signal data packet received is a disarm signal, wherein the not armed state disables capturing of the diagnostic trace of the remote network adapter.

18. The system of claim 13, wherein a captured state of the remote network adapter is correlated with the host operating system.

19. A method for implementing integrated diagnostic functions on a virtual network configuration, the method comprising:
receiving, at a host operating system of a computing device included in the virtual network configuration, an operator command to enable a trap responsive to a detected software error condition detected by the host operating system;
transmitting to a remote network adapter from the host operating system, a diagnostic signal data packet triggered by a software trap event occurring within the host operating system, wherein the software trap event comprises the software error condition detected by the host operating system;
wherein the diagnostic signal data packet is associated with a diagnostic state of the remote network adapter, and causes the remote network adapter to perform a hardware diagnostic function indicated by the diagnostic signal data packet, the diagnostic function comprising one or more of a trap, a trace, and a dump, thereby facilitating the coordination of hardware and software diagnostics at the same time.

20. The method of claim 19, further comprising causing the remote network adapter to capture a diagnostic trace of the remote network adapter in the event the transmitted diagnostic signal data packet includes a capture signal.

21. The method of claim 20, further comprising causing the remote network adapter to set the diagnostic state of the remote network adapter to be ready to capture a diagnostic trace of the remote network adapter in the event the transmitted diagnostic signal data packet includes an arm signal.

22. The method of claim 21, further comprising causing the remote network adapter to capture the diagnostic trace of the remote network adapter in the event communication with the host operating system is lost while the diagnostic state is armed.

23. The method of claim 22, further comprising causing the remote network adapter to set the diagnostic state of the remote network adapter to a not armed state in the event the transmitted diagnostic signal data packet is a disarm signal, wherein the not armed state disables capturing of the diagnostic trace of the remote network adapter.

24. The method of claim 23, further comprising correlating a captured state of the remote network adapter with the host operating system.

25. A computer readable storage medium having computer readable instructions stored thereon that, when executed by a computer, implement a method of integrating diagnostic functions on a virtual network configuration, wherein the method comprises:
- receiving, at a host operating system of a computing device included in the virtual network configuration, an operator command to enable a trap responsive to a detected software error condition detected by the host operating system;
- transmitting to a remote network adapter from the host operating system, a diagnostic signal data packet triggered by a software trap event occurring within the host operating system, wherein the software trap event comprises the software error condition detected by the host operating system;
- wherein the diagnostic signal data packet is associated with a diagnostic state of the remote network adapter, and causes the remote network adapter to perform a hardware diagnostic function indicated by the diagnostic signal data packet, the diagnostic function comprising one or more of a trap, a trace, and a dump, thereby facilitating the coordination of hardware and software diagnostics at the same time.

26. The computer readable storage medium of claim 25, wherein the method further comprises causing the remote network adapter to capture a diagnostic trace of the remote network adapter in the event the transmitted diagnostic signal data packet includes a capture signal.

27. The computer readable storage medium of claim 26, wherein the method further comprises causing the remote network adapter to set the diagnostic state of the remote network adapter to be ready to capture a diagnostic trace of the remote network adapter in the event the transmitted diagnostic signal data packet includes an arm signal.

28. The computer readable storage medium of claim 27, wherein the method further comprises causing the remote network adapter to capture the diagnostic trace of the remote network adapter in the event communication with the host operating system is lost while the diagnostic state is armed.

29. The computer readable storage medium of claim 28, wherein the method further comprises causing the remote network adapter to set the diagnostic state of the remote network adapter to a not armed state in the event the transmitted diagnostic signal data packet is a disarm signal, wherein the not armed state disables capturing of the diagnostic trace of the remote network adapter.

30. The computer readable storage medium of claim 27, wherein the method further comprises correlating a captured state of the remote network adapter with the host operating system.

* * * * *